United States Patent Office 2,825,739
Patented Mar. 4, 1958

2,825,739

PRODUCTION OF AMINO ACIDS AND THEIR DERIVATIVES

Sidney James Allen, London, and James Gordon Napier Drewitt, Spondon, near Derby, England, assignors to British Celanese Limited, a corporation of Great Britain No Drawing. Application August 14, 1953
Serial No. 374,442

Claims priority, application Great Britain October 6, 1952

2 Claims. (Cl. 260—486)

This invention relates to improvements in the production of amino acids and their derivatives and is more particularly concerned with an improved method of obtaining 6-amino-carboxylic acids or their esters or lactams and especially 6-amino-caproic acid and its esters or its lactam.

According to the present invention, 6-amino-caproic acid and its esters and lactam and their formyl or acetyl derivatives can be produced by a two-stage process in which each of the stages constitutes a novel process. In the first stage nitromethane is caused to react in equimolecular proportions with a 1.3-butadiene-1-carboxylic ester, and in the second stage the resulting 6-nitro-3-hexene-1-oic ester is selectively reduced by catalytic hydrogenation so as to reduce the double bond and reduce the nitro group without reducing the ester group.

Nitromethane has of course three labile hydrogen atoms and therefore can react with three molecules of a 1.3-butadiene-1-carboxylic ester. In order to limit the addition to equal moles of the two reagents, the nitromethane may be used in molecular excess, for example up to 5 or 10 moles of the nitromethane to 1 mole of butadiene carboxylic ester, but it is preferable to carry out the reaction in presence of an equimolecular proportion of a base, especially a strong base such as caustic soda, caustic potash or a quaternary ammonium base, for example trimethyl benzyl ammonium hydroxide, which has the effect of preventing the addition of more than one mole of the butadiene carboxylic ester to the nitromethane. In any case, the reaction is preferably carried out in the presence of such a base.

Thus nitromethane may be mixed with an equimolecular proportion of caustic potash in ethanol or of trimethyl benzyl ammonium hydroxide while keeping the temperature low. An equimolecular proportion of butadiene-1-carboxylic ester is then added slowly with stirring while allowing the temperature to rise or warming up the mixture. Finally if necessary the mixture may be refluxed. The base may then be neutralised by addition of acid and the crude product subjected to hydrogenation.

These adducts are new compounds and have the general formula

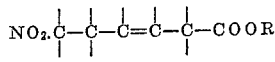

where R is the hydrocarbon radicle of a simple monohydroxy compound and the valencies of the carbon atoms are satisfied by hydrogen or other radicles, e. g. hydrocarbon radicles. When nitromethane is added to an ester of 1.3-butadiene-1-carboxylic acid itself

the adduct has the formula

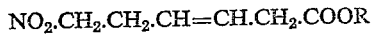

where R has the same connotation as before.

The selective hydrogenation of the adduct may be effected with the aid of active nickel or active cobalt with or without a support such as kieselguhr or pumice, or may be carried out using Raney nickel or Raney cobalt. Generally the temperatures necessary may be from room temperature up to about 150° C. and the hydrogen pressure from about 30 lbs. to 3000 lbs. per square inch. Temperature, hydrogen pressure and duration of treatment are regulated so as to avoid reduction of the ester group. Alternatively a platinum or palladium catalyst, for example Adams platinum catalyst, may be used.

In order to avoid or reduce the formation of secondary amines, the hydrogenation may be carried out in presence of ammonia or a source of formyl radicles, for example methyl or ethyl formate. Presence of a formyl radicle also tends to prevent lactam formation. Adams platinum catalyst may be used in presence of acetic anhydride to achieve the same result of avoiding or reducing formation of secondary amines.

The butadiene-1-carboxylic esters may be made from 1.3-butadiene-1-nitrile by hydrolysis to the free acid followed by esterification, e. g. with methyl or ethyl alcohol, but are best prepared by the direct alcoholysis of the nitrile, for example with methanol and ethanol in presence of hydrochloric acid.

The invention is of greatest value in the production of 6-amino-caproic acid and its derivatives. It may also, however, be applied to the production of 6-amino-caproic acids substituted at any of the carbon atoms. To produce such products either the appropriate derivative of 1.3-butadiene-1-carboxylic ester may be used, e. g. sorbic ester, or the appropriate derivative of nitromethane, for example nitroethane or other nitroparaffin containing at least one labile hydrogen atom on the carbon atom alpha to the nitro group. In all these additions of nitroparaffins to 1.3-butadiene-carboxylic esters, it is advisable to have present a small amount of hydro-quinone or other polymerisation inhibitor.

When the hydrogenation is carried out in the absence of formyl or acetyl radicles, some of the product is usually obtained in the form of the ester and some in the form of lactam, while when formyl or acetyl radicles are present during the hydrogenation the N-formyl or N-acetyl derivative of the amino acid ester is produced. The lactam, the free amino acid esters, the free amino acids themselves (obtained by hydrolysis of the aminoacid esters or their formyl or acetyl derivatives), or the formyl or acetyl derivatives of the amino esters may all be used as starting materials for the production of polyamides. Indeed the mixture of ester and lactam which can be obtained by direct hydrogenation of the nitropentene carboxylic ester may itself be the starting material for polymerisation without separation of the ester from the lactam.

The following examples illustrate the invention but do not limit it in any way:

*Example 1*

61 parts by weight of nitromethane were added to a solution of 56 parts of caustic potash in 190 parts of ethanol, the temperature being maintained at 5–10° C. during the addition. The mixture was allowed to warm to room temperature and 126 parts by weight of ethyl 1.3-butadiene-1-carboxylate added slowly whilst stirring. When addition was complete, the mixture was heated to 40–45° C. and this temperature maintained for two hours. The mixture was then neutralised with hydrochloric acid and the ethanol and any residual nitromethane evaporated under reduced pressure (140 mms. of mercury). The crude 5-nitro-2-pentene-1-carboxylic ethyl ester was washed with very dilute hydrochloric acid and finally with water until neutral.

Example 2

The product from Example 1 was hydrogenated using 5 parts of Raney nickel wet with ethanol. Hydrogenation was carried out at 100–120° C. under a hydrogen pressure of 250–400 lbs. per sq. in. The Raney nickel catalyst was filtered off and the hydrogenation product fractionated under reduced pressure. The fraction collected at a boiling range of 136–140° C. at 10 mms. of mercury was ε-caprolactam.

Having described our invention, what we desire to secure by Letters Patent is:

1. Process for the production of an ester of 5-nitro-2-pentene-1-carboxylic acid, which comprises forming a mixture of approximately equimolecular proportions of nitromethane, an ester of 1,3-butadiene-1-carboxylic acid, and a strong base selected from the group which consists of the alkali metal hydroxides and quaternary ammonium bases, and allowing reaction to take place at an elevated temperature up to the normal boiling point of the mixture.

2. Process for the production of an ester of 5-nitro-2-pentene-1-carboxylic acid, which comprises forming a mixture of approximately equimolecular proportions of nitromethane and a strong base selected from the group which consists of the alkali metal hydroxides and quaternary ammonium bases at a temperature of 5°–10° C., and then adding an equimolecular proportion of an ester of 1,3-butadiene-1-carboxylic acid and allowing reaction to take place at a temperature of 40°–45° C.

References Cited in the file of this patent
UNITED STATES PATENTS

| | | |
|---|---|---|
| 2,390,918 | Bruson | Dec. 11, 1945 |
| 2,527,509 | Allen | Oct. 31, 1950 |
| 2,546,960 | Moe et al. | Apr. 3, 1951 |